(12) United States Patent
Proietty et al.

(10) Patent No.: US 8,055,437 B2
(45) Date of Patent: Nov. 8, 2011

(54) CO2 INFORMATION DISPLAY AND METHOD

(75) Inventors: John Proietty, Ferndale, MI (US); Diana D. Brehob, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

(21) Appl. No.: 12/405,294

(22) Filed: Mar. 17, 2009

(65) Prior Publication Data
US 2010/0241339 A1   Sep. 23, 2010

(51) Int. Cl.
*G06F 19/00* (2006.01)
*F02D 41/14* (2006.01)
*G06F 11/30* (2006.01)

(52) U.S. Cl. ........ 701/109; 701/104; 701/115; 702/182; 340/439

(58) Field of Classification Search ................ 123/1 A, 123/478, 480, 494, 575, 585, 672, 698, 704; 701/101–105, 109, 114, 115; 60/276; 340/438, 340/439; 73/114.71, 114.72; 702/182, 188
See application file for complete search history.

(56) References Cited

U.S. PATENT DOCUMENTS

| | | | |
|---|---|---|---|
| 5,099,680 A | 3/1992 | Fournier et al. | |
| 6,216,527 B1 | 4/2001 | Beecham et al. | |
| 6,382,014 B1 | 5/2002 | Breton | |
| 6,470,732 B1 | 10/2002 | Breton | |
| 6,615,646 B2 | 9/2003 | Schell | |
| 6,644,097 B2 | 11/2003 | Davey et al. | |
| 6,775,623 B2 | 8/2004 | Ali et al. | |
| 6,975,217 B2 | 12/2005 | Endoh | |
| 7,769,526 B2 * | 8/2010 | Chen et al. | 701/104 |
| 2002/0062191 A1 | 5/2002 | Yanagisawa | |
| 2004/0093264 A1 | 5/2004 | Shimizu | |
| 2005/0021191 A1 | 1/2005 | Taniguchi et al. | |
| 2005/0205022 A1 | 9/2005 | Ito et al. | |
| 2011/0000726 A1* | 1/2011 | Tanaka | 180/65.265 |

FOREIGN PATENT DOCUMENTS

| | | | |
|---|---|---|---|
| BR | 200501544 A | * | 12/2006 |
| EP | 0 841 541 A1 | | 5/1998 |
| JP | 2004104887 A | * | 4/2004 |

* cited by examiner

*Primary Examiner* — Willis Wolfe, Jr.

(57) ABSTRACT

A method and system for estimating CO2 produced by an internal combustion engine disposed in a vehicle and transmitting the CO2 produced to a display device within the vehicle are disclosed. Estimated CO2 produced is based on amount of fuel consumed and fuel composition, e.g., alcohol content in a gasoline-alcohol blend. The amount of fuel consumed is computed based on fuel pulse width commanded to fuel injectors disposed in the engine, the pressure drop across the fuel injectors, and fuel injector nozzle cross-section. Instantaneous CO2 produced and/or average CO2 produced can be computed and displayed. Instantaneous CO2 produced is averaged over a short interval with the display updated regularly. Average CO2 produced is averaged over a typically longer interval, being reset, in one embodiment, by an operator of the vehicle depressing a reset button.

17 Claims, 2 Drawing Sheets

CO2 INFORMATION DISPLAY AND METHOD

BACKGROUND

1. Field

The present invention relates to information displays in automotive vehicles.

2. Background Art

Due to global warming and the concern for how human activity contributes to higher carbon dioxide (CO2) concentration in the atmosphere exacerbating global warming, some drivers are interested in determining their personal impact on CO2 entering the atmosphere. Combustion of carbon-based fuels in coal-fired power plants, airplanes, automotive vehicles, etc. produces CO2 which in the aggregate, at present, overbalances the ability of plant life to react CO2 into oxygen (O2). Environmentally-minded people are interested in obtaining a measure of how much CO2 they are responsible for in all aspects of their life including driving a vehicle powered by carbon-based fuels. Some individuals purchase carbon offsets when they book an airline journey. The airline provides an estimate of the prorated mass of CO2 per passenger exhausted by the plane for the anticipated journey. The individual can pay a surcharge for a CO2 offset (commonly called carbon offset) in an amount equal to the amount of CO2 added to the atmosphere due to their flight. The surcharge is used to finance an activity which reduces CO2, such as providing a biomass-powered generator or wind-powered generator to replace a diesel-fueled generator in a remote village.

Environmentally-conscious individuals wishing to purchase carbon offsets in the amount of their automotive CO2 emissions would like to determine the amount of CO2 that their automobile is emitting.

SUMMARY

A method is disclosed for estimating CO2 produced by an internal combustion engine disposed in a vehicle and transmitting the estimated CO2 produced to a display device within the vehicle. The estimated CO2 produced can also be communicated to an electronic device not permanently coupled to the vehicle.

There are many ways that the estimated CO2 produced may be presented to the vehicle operator. Some operators desire a measure of the amount of CO2 produced in a cumulative fashion allowing them to purchase carbon offsets as they see fit. Thus, in one embodiment of the invention, the display is provided an operator reset button, which the operator resets, possibly when passing a milestone, such as 10 tons of CO2. The operator can then purchase 10 tons of carbon offset. In such embodiment, the display of estimated CO2 produced is an accumulated mass of CO2 produced in units of mass, which sums up the amount of CO2 since a last reset of an operator reset button.

In an alternative embodiment, the display is automatically reset upon a key on operation. In this embodiment, the operator obtains a measure of mass of CO2 produced since the beginning of a particular trip. This is useful in a vehicle which is used for predictable trips, e.g., an individual traveling to and from work on the same route daily or a fleet operator managing vehicles on predictable delivery trips. The datum provided in such an embodiment provides a measure of how other factors, such as: weather, load, or driving style, affect the estimated CO2 produced over the same trip. In this embodiment, the estimated CO2 produced is trip CO2 produced, in units of mass.

In another embodiment, estimated CO2 produced is an average CO2 produced, displayed in units of mass of CO2 per distance traveled. Average CO2 produced is computed as a mass of CO2 produced since a last reset divided by a distance traveled since the last reset. The reset, in one embodiment, is operator controlled by depressing an operator reset button; and in another embodiment, it is a key on operation.

In yet another embodiment, estimated CO2 produced is an instantaneous CO2 produced, displayed in units of mass of CO2 per distance traveled. Instantaneous CO2 produced is computed as a mass of CO2 produced during an interval divided by a distance traveled over the interval. In one embodiment, the interval is a short period of time, e.g., 1-60 seconds. Although it is called instantaneous CO2 produced, it is averaged over a short interval. Without a short period for averaging, the displayed value for instantaneous CO2 production would swing wildly, thereby providing meaningless output to the operator. Instantaneous CO2 produced can be computed as a rolling average, a weighted rolling average or any other known averaging technique. The instantaneous CO2 produced provides a measure of the effect that the current driving conditions have on CO2 production, with the display update regularly, with a frequency related to the time interval. Alternatively, the interval is a distance.

The estimated CO2 produced is based on an amount of fuel consumed and composition of the fuel used in the vehicle. For a vehicle having fuel injectors, fuel consumption is determined based on: the fuel pulse widths commanded to the fuel injectors and a pressure drop across the fuel injectors. By knowing the model of the injector installed into the engine, the fuel consumption is further based on flow characteristics and cross-sectional area of the injector's nozzle. Typically, all injectors of a particular batch are similar enough from injector to injector that an average value of flow coefficients and cross-sectional area are used to describe all injectors. For greater accuracy, each injector can be tested and fuel consumption is computed based on the values for that injector along with the fuel pulse width and pressure drop for each injector. The engine's fuel consumption is determined by summing up the fuel injected by each injector.

For an engine which may be supplied alcohol fuels, a quantity of alcohol in the fuel supplied to the engine may be estimated based on at least one of a signal from a fuel sensor disposed in a fuel system supplying fuel to the engine and an exhaust gas oxygen sensor disposed in an exhaust system of the engine. Estimated CO2 produced may be adjusted based on alcohol content of the fuel. Similarly, accommodations can be made for any other fuel or fuel mixture.

Embodiments of the invention also include a system for determining estimated CO2 produced by a fuel oxidizing device. A fuel storage device supplies fuel to the fuel oxidizing device, the fuel delivery being measured by a metering device. An electronic control unit is coupled to the metering device. Estimated CO2 produced is based on the amount of fuel delivered and, in some embodiments, also based on fuel composition.

The system and method can be applied to any fuel oxidizing device. A non-exhaustive list of alternatives for fuel oxidizing device includes: jet engines, internal combustion engines, power plants, and fuel cells. Any power plant or combustion device which oxidizes a carbon-containing fuel is contemplated by the inventors of the present invention as being the fuel oxidizing device.

Also disclosed is a method for estimating CO2 produced by a fuel oxidizing device, including determining an amount of fuel supplied to the fuel oxidizing device, estimating the CO2 produced based on the amount of fuel supplied to the fuel oxidizing device over a period of time and fuel composition, transmitting the CO2 produced to a display device, which in one embodiment is disposed in a vehicle. In one embodiment, fuel composition is estimated based on a signal from a fuel sensor disposed in a fuel supply of the fuel oxidizing device.

DETAILED DESCRIPTION OF THE EMBODIMENT(S)

Figure 1:
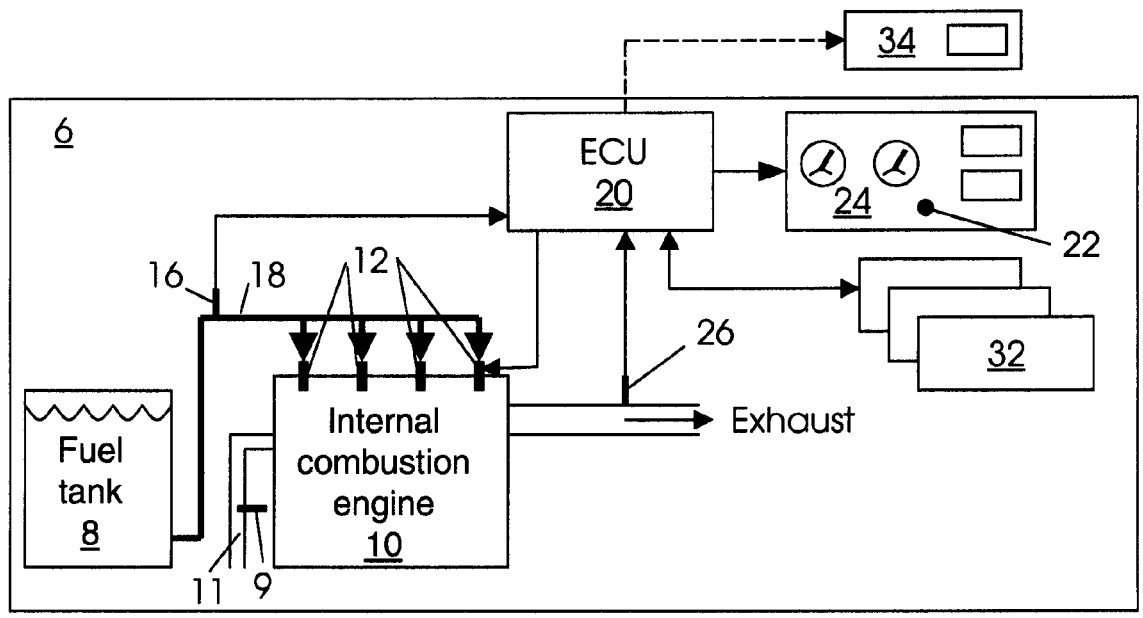
FIG. 1 is a schematic representation of a vehicle with a display of CO2 produced according to an embodiment of the present invention.

In FIG. 1, a vehicle 6 is shown which has a fuel tank 8 in which a carbon-based fuel, e.g., gasoline is contained. Fuel from fuel tank 8 is supplied to engine 10 via fuel injectors 12 which meter the fuel provided to engine cylinders. The air provided to engine cylinders is measured by a metering device 9 coupled to an engine intake 11. It is known by one skilled in the art to determine air flow based on an air mass meter or a speed-density system, basing the air flow on the rotational speed of the engine and the density in intake 11. Fuel injectors are coupled to an electronic control unit (ECU) 20, which provides a pulse of a particular width to the fuel injectors 12 which commands an opening duration to each fuel injector 12. Based on the pressure drop across the fuel injector nozzle, the size of the opening of the fuel injector nozzle, the flow characteristics of the fuel injector nozzle, and the duration of the opening, the amount of fuel supplied to the engine in each injection can be computed. The pressure drop across the fuel injector nozzle can be computed based on a signal from a pressure sensor 16 located in the fuel rail 18. By summing the individual injection amounts over a period of time, fuel consumption rate can be determined. Typically, the measurement is in terms of volume, which can be converted to mass by knowing the fuel's density. Based on these data, an information display 24 in vehicle 6 can be used to display miles traveled since the driver has last reset the display, the average fuel economy in miles per gallon since the last reset, and instantaneous fuel economy, according to the prior art. According to an embodiment of the present invention, it is possible to estimate in ECU 20 the amount of CO2 produced and display that on information display 24.

Continuing to refer to FIG. 1, various sensors and actuators 32 provide information to and are controlled by, respectively, ECU 20. For example, the vehicle may have an engine speed sensor from which engine speed can be computed and a wheel speed sensor from which distance traveled can be computed.

The amount of CO2 produced can be computed based on the amount of fuel consumed and the amount of carbon in the fuel. In the table below representative values for various fuels are provided below by way of example and are not intended to be limiting. Fuels which are mixtures of components: gasoline, diesel, and natural gas, vary depending on the location from which they are derived. The chemical formulas provided for fuels which are mixtures are averaged over the various chemical components of that fuel. The table below shows representative mixtures of fuels.

| Fuel type | Chemical formula | Heating value [MJ/kg] | Molecular Weight [kg/k-mol] | Moles $CO_2$ per mole fuel | kg $CO_2$ per kg fuel | kg $CO_2$ per kJ fuel energy |
|---|---|---|---|---|---|---|
| Gasoline | $C_{7.9}H_{14.8}$ | 44.0 | 110 | 7.93 | 3.17 | 72.1 |
| Diesel | $C_{12.3}H_{22.1}$ | 42.0 | 170 | 12.30 | 3.18 | 75.8 |
| Ethanol | $C_2H_5OH$ | 26.9 | 46 | 2.00 | 1.91 | 71.1 |
| Methanol | $CH_3OH$ | 20.0 | 32 | 1.00 | 1.38 | 68.8 |
| Natural gas | $C_{1.14}H_{4.33}$ | 45.0 | 18 | 1.14 | 2.79 | 61.9 |
| Propane | $C_3H_8$ | 46.4 | 44 | 3.00 | 3.00 | 64.7 |

Ethanol and methanol, which are oxygen-containing fuels, produce less mass of CO2 per mass of fuel burned than hydrocarbon fuels, such as gasoline. However, because alcohol fuels contain oxygen, they have a lower heating value and thus more fuel must be burned to release the same amount of chemical energy. In the table, the mass of CO2 produced per amount of fuel energy released is contained in the rightmost column.

The fuel which may be supplied is specified by the vehicle manufacturer, e.g., gasoline as opposed to diesel fuel. Typically, little variation in fuel type is accommodated by the vehicle. One notable counter example, however, is flex fuel vehicles which can accommodate a gasoline and alcohol mixture, ranging from nearly 0-100% alcohol. Because the heating value of alcohol is less than that of gasoline, ECU 20 calculates the alcohol percentage so that ECU 20 commands a fuel pulse width to the injectors appropriate to provide the operator demand for torque taking into account the fuel's alcohol content. In one embodiment, ECU 20 computes the alcohol content of the fuel based on a signal from a fuel sensor. Alternatively, alcohol percentage is estimated based on the output of an oxygen sensor 26 placed in the engine's exhaust. The latter method is described in commonly assigned U.S. Pat. No. 6,644,097 B2, which is incorporated herein in its entirety. The accuracy of CO2 produced is improved when the computation takes into account the composition of the fuel consumed.

One way to compute the CO2 produced from a gasoline-alcohol blend is:

kg CO2/kg of blend=% alc*(kg CO2/kg alc)+(1−% alc)*(kg CO2/kg gasoline), where % alc is the alcohol percentage in the blend on a mass basis. Using the numbers from the table above for ethanol and gasoline:

kg CO2/kg of blend=% alc*1.91+(1−% alc)*3.17.

In one embodiment, the CO2 display is part of the operator information display 24 provided in vehicle 6. In another embodiment, sufficient information may be supplied wirelessly by ECU 20 to a remote electronic device 34 for further processing, storage, display, graphing, etc. of the data, as examples. Such wireless electronic devices may include: a global positioning system, personal digital assistant, computers, smart phones, or any other device which can accept data from a transmitter. A fleet operator may be interested in keeping track of the data for multiple vehicles in a single computer or other storage device. Further, the fleet operator may wish to be able to transfer the desired data automatically through wireless communication.

The operator information display 24, in one embodiment, provides a display of CO2 produced per distance traveled since a last reset. A reset button 22 is provided on the operator information display 24. Alternatively or additionally, the operator information display 24 displays instantaneous CO2 produced per distance traveled. Because an instantaneous computation is subject to variation, the instantaneous computation is averaged over a short period of time, a non-limiting example is 3 seconds, and updated on that interval. The averaging can be a rolling average or any other known method. Alternatively, the average CO2 produced per distance traveled display is automatically reset within ECU 20 each time vehicle 6 is restarted. This allows the operator to compare the CO2 production rate for various trips that are taken. In yet another embodiment, the operator information display 24 is user selectable.

Referring back to FIG. 1, fuel consumed can alternatively be estimated based on an amount of air consumed based on a signal from an air mass signal 9 (connection to ECU 20 not shown) in intake 11 and a signal from an exhaust gas oxygen sensor 26 in the exhaust from which fuel-air ratio can be determined. Mass of fuel, $m_f$, can be determined by: $m_f = m_{air} * (F/A)$, where $m_{air}$ is mass of air and F/A is the fuel-air ratio. Similarly, $dm_f/dt = (dm_{air}/dt)*(F/A)$ for a time rate based form of the equation.

Figure 2:
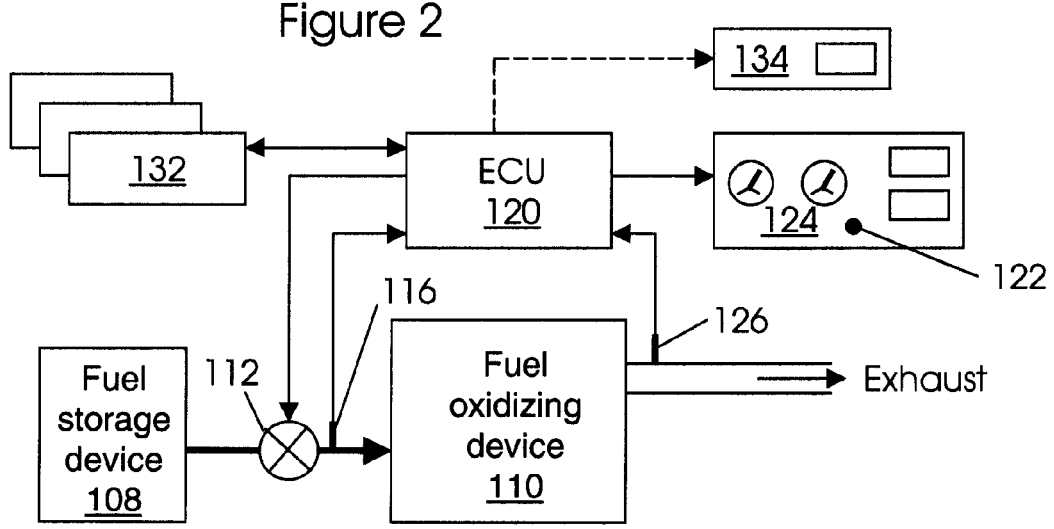
FIG. 2 is a schematic representation a display device capable of displaying CO2 produced by a fuel oxidizing device according to an embodiment of the present invention.

CO2 produced, according to an aspect of the present invention, can be estimated for fuel oxidizing devices, such as shown in FIG. 2. A fuel oxidizing device 110 is supplied fuel from fuel storage device 108. In one embodiment, the fuel is a liquid fuel. In another embodiment, the fuel is a gaseous fuel. In yet another embodiment, the fuel is a solid fuel, such as coal or biomass pellets. The fuel is metered to fuel oxidizing device 110 via metering device 112, which is controlled by ECU 120. Based on the fuel supplied to fuel oxidizing device 110 passing through metering device 112, an estimate of CO2 produced in fuel oxidizing device 100 is computed and provided to display 124. In one embodiment, display device 124 has an operator reset button 122.

In FIG. 2, a fuel sensor 116 is provided in the fuel supply line. In other embodiments, e.g., with coal combustion, determination of fuel properties are determined offline; then, the results are provided to ECU 120 to ensure proper metering of the fuel. In some embodiments, an exhaust gas composition sensor 126 is coupled to the fuel oxidizing device's exhaust, with a signal from exhaust gas composition sensor 126 being at least one factor employed by ECU 120 to estimate fuel composition. Various sensors and actuators 132 communicate with ECU 120.

CO2 produced is computed in ECU 120 and displayed in device 124. Alternatively, CO2 produced by fuel oxidizing device 110 is stored in ECU and/or transmitted wirelessly to a remote display 134. In one embodiment, CO2 produced is a mass of CO2 produced. In another embodiment, CO2 produced is a production rate, mass of CO2 produced per unit time. In yet other embodiments, CO produced is computed as mass of CO2 produced per distance traveled.

Figure 3:
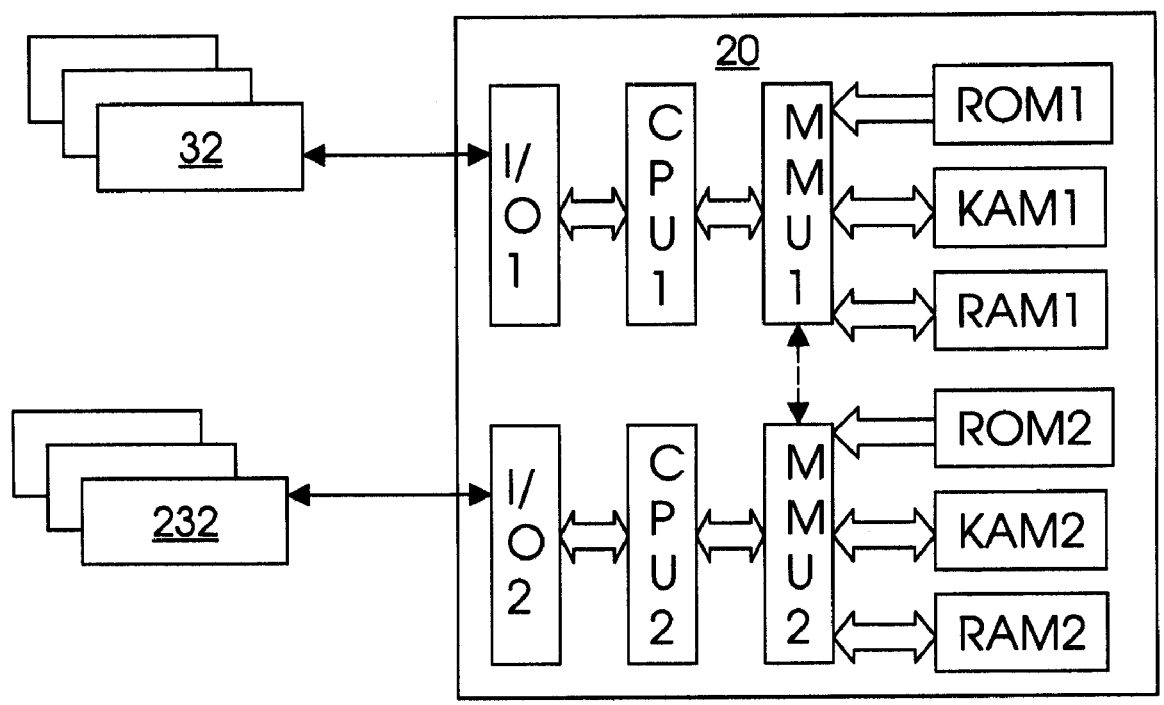
FIG. 3 is a schematic representation of an ECU according to an embodiment of the invention.

Returning to FIG. 1, electronic control unit 20 is provided to control functions associated with engine 10 and/or any other control on board vehicle 6. ECU 20 has one or more microprocessor central processing units (shown as CPU1 and CPU2 in FIG. 3), in communication with memory management units (MMU1 and MMU2). MMUs control the movement of data among the various computer readable storage media and communicate data to and from the CPUs. The computer readable storage media preferably include volatile and nonvolatile storage in read-only memory (ROM1 and ROM2), random-access memory (RAM1 and RAM2), and keep-alive memory (KAM1 and KAM2), for example. KAM may be used to store various operating variables while a CPU is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU in controlling the engine or vehicle into which the engine is mounted. The computer-readable storage media may also include floppy disks, CD-ROMs, hard disks, and the like. CPU1 and CPU2 communicate with various sensors and actuators 32 via input/output (I/O1 and I/O2) interfaces, respectively. Some ECU 20 architectures do not contain a MMU. If no MMU is employed, the CPU manages data and connects directly to ROM, RAM, and KAM. ECU 20, as shown as a part of vehicle 6 in FIG. 1, is shown in FIG. 3 as having 2 I/Os, 2 CPUs, 2 MMUs, 2 ROMs, 2 KAMs, and 2 RAMs simply to indicate that vehicle 6 may have more than one of any of these elements. For purposes of schematic illustration, all of the computing capability on board vehicle 6 is shown as ECU 20, even though it should be appreciated that the computing capability may be distributed. Furthermore, the elements of ECU 20 may communicate among each other and with external sensors and actuators 32 by direct connection or wirelessly.

While particular embodiments of the invention have been shown and described, numerous variations and alternate embodiments will occur to those skilled in the art. Accordingly, it is intended that the invention be limited only by the appended claims.

What is claimed:

1. A method for displaying CO2 information, comprising:
   determining an estimated CO2 produced over an interval by an internal combustion engine disposed in a vehicle based on at least an amount of fuel consumed by the vehicle during the interval;
   displaying the estimated CO2 produced on a display device within the vehicle;
   and further comprising:
   communicating the estimated CO2 produced to an electronic device not permanently coupled to the vehicle.

2. A method for displaying CO2 information, comprising:
   determining an estimated CO2 produced over an interval by an internal combustion engine disposed in a vehicle based on at least an amount of fuel consumed by the vehicle during the interval; and
   displaying the estimated CO2 produced on a display device within the vehicle wherein the amount of fuel consumed is estimated by:
     estimating an amount of air delivered to the engine during the interval based on at least one sensor located in an engine intake;
     determining the fuel-air ratio delivered to the engine based on an exhaust gas oxygen sensor; and
     computing the amount of fuel consumed by the vehicle during the interval based on the amount of air delivered and the fuel-air ratio.

3. A method for displaying CO2 information, comprising:
   determining an estimated CO2 produced over an interval by an internal combustion engine disposed in a vehicle based on at least an amount of fuel consumed by the vehicle during the interval; and
   displaying the estimated CO2 produced on a display device within the vehicle wherein the engine is supplied of a fuel of a particular composition and the estimated CO2 produced is further based on the composition of the fuel used in the vehicle.

4. A method for displaying CO2 information, comprising:
   determining an estimated CO2 produced over an interval by an internal combustion engine disposed in a vehicle based on at least an amount of fuel consumed by the vehicle during the interval; and displaying the estimated CO2 produced on a display device within the vehicle, the method further comprising:
  estimating a quantity of alcohol in the fuel supplied to the engine based on at least one of a signal from a fuel sensor disposed in a fuel system supplying fuel to the engine and an exhaust gas oxygen sensor disposed in an exhaust system of the engine; and
  modifying the estimated CO2 produced based on alcohol content of the fuel.

5. A system for computing CO2 produced by a fuel oxidizing device configured to oxidize fuel having a fuel composition, comprising:
  a fuel storage device for storing fuel for the fuel oxidizing device;
  a metering device configured to meter the fuel delivered to the fuel oxidizing device from the fuel storage device, and operable to output a signal related to the amount of fuel passing through the metering device;
  a display device; and
  an electronic control unit coupled to the metering device, the electronic control unit being configured to: estimate an amount of fuel delivered to the fuel oxidizing device based on the amount of fuel passing through the metering device, compute an estimated CO2 produced by the fuel oxidizing device based at least on part on the amount of fuel delivered and the fuel composition; and displaying the estimated CO2 produced on the display device further comprising:
    a vehicle into which the fuel oxidizing device and the display device are mounted;
    an operator reset button coupled to the display device, wherein the estimated CO2 produced is average CO2 produced over a period of time elapsed since last reset of the operator reset button.

6. A system for computing CO2 produced by a fuel oxidizing device configured to oxidize fuel having a fuel composition, comprising:
  a fuel storage device for storing fuel for the fuel oxidizing device;
  a metering device configured to meter the fuel delivered to the fuel oxidizing device from the fuel storage device, and operable to output a signal related to the amount of fuel passing through the metering device;
  a display device; and
  an electronic control unit coupled to the metering device, the electronic control unit being configured to: estimate an amount of fuel delivered to the fuel oxidizing device based on the amount of fuel passing through the metering device, compute an estimated CO2 produced by the fuel oxidizing device based at least on part on the amount of fuel delivered and the fuel composition; and displaying the estimated CO2 produced on the display device further comprising a fuel sensor coupled to the electronic control unit, wherein the electronic control unit is further configured to estimate fuel composition of the fuel oxidizing device based on the fuel sensor signal and further bases the estimated CO2 produced on fuel composition.

7. A method for displaying CO2 information, comprising:
  determining an estimated CO2 produced over an interval by an internal combustion engine disposed in a vehicle based on at least an amount of fuel consumed by the vehicle during the interval; and
  displaying the estimated CO2 produced on a display device within the vehicle wherein the interval is defined by a reset event and the estimated CO2 produced is an accumulated mass of CO2 produced displayed on the display device in units of mass of CO2 since a last reset event.

8. The method of claim 7, wherein the vehicle has an operator reset button and the reset event occurs when such operator reset button is actuated.

9. The method of claim 7, wherein the reset event is a key on event of the vehicle.

10. A method for estimating CO2 produced by a fuel oxidizing device, comprising:
  determining an amount of fuel supplied to the fuel oxidizing device;
  computing an estimated CO2 produced based on the amount of fuel supplied to the fuel oxidizing device over a defined period of time; and
  displaying estimated CO2 produced on a display device wherein the estimated CO2 produced is further based on fuel composition of fuel supplied to the fuel oxidizing device and fuel composition is estimated based on a signal from a fuel sensor disposed in a fuel supply of the fuel oxidizing device.

11. The method of claim 10 wherein the fuel oxidizing device is one of an internal combustion engine, a power plant, a fuel cell, and a gas turbine engine.

12. The method of claim 10 wherein the fuel oxidizing device and the display device are disposed in a vehicle.

13. The method of claim 10 wherein the fuel oxidizing device is an internal combustion engine, the fuel is metered to the fuel oxidizing device by controlling a fuel pulse width commanded to fuel injectors coupled to the engine, the amount of fuel supplied is determined based on at least the fuel pulse width and a fuel pressure upstream of the fuel injectors.

14. A method for displaying CO2 information, comprising:
  determining an estimated CO2 produced over an interval by an internal combustion engine disposed in a vehicle based on at least an amount of fuel consumed by the vehicle during the interval; and
  displaying the estimated CO2 produced on a display device within the vehicle wherein the vehicle includes an electronic control unit, the engine includes fuel injectors which receive fuel pulse width commands from the electronic control unit and a fuel pressure sensor located in a fuel rail upstream of the fuel injectors, the fuel injectors have nozzles of a known cross-sectional area, the method further comprising:
    estimating the amount of fuel consumed by the vehicle during the interval based on a signal from the fuel pressure sensor, the fuel pulse widths commanded, and the cross-sectional area of the fuel injector nozzles.

15. The method of claim 14, wherein a wheel speed sensor is coupled to the electronic control unit from which distance traveled can be estimated, the interval is a defined time interval, the estimated CO2 produced is average CO2 produced displayed in units of mass of CO2 per distance traveled, and the average CO2 produced is computed as: (amount of fuel consumed over the defined time interval) times (CO2 produced per amount of fuel consumed) divided by (distance traveled over the defined time interval), and CO2 produced per amount of fuel consumed, with values of CO2 produced per amount of fuel consumed being stored in the electronic control unit, the values of CO2 produced per amount of fuel consumed being based on the type of fuel being consumed.

16. The method of claim 15, wherein the defined time interval is based on time elapsed since a last reset event, such last reset event being effected by actuation of an operator reset button.

17. The method of claim 15, wherein the display device displays instantaneous CO2 produced, the method further comprising: regularly and repeatedly updating display at the defined time interval which is in the range of 1 to 60 seconds.

* * * * *